United States Patent
Shirai

[11] Patent Number: 6,018,308
[45] Date of Patent: Jan. 25, 2000

[54] OBSTACLE RECOGNITION SYSTEM FOR AUTOMOTIVE VEHICLE

[75] Inventor: Noriaki Shirai, Kariya, Japan

[73] Assignee: Denso Corporation, Kariya, Japan

[21] Appl. No.: 09/121,050

[22] Filed: Jul. 23, 1998

[30] Foreign Application Priority Data

Jul. 23, 1997 [JP] Japan .................................... 9-197364

[51] Int. Cl.[7] .................................................. G01S 13/93
[52] U.S. Cl. ............................. 342/70; 342/61; 342/71; 342/72; 342/118; 342/175; 342/195; 701/1; 701/36; 701/301
[58] Field of Search .................................. 342/23, 24, 27, 342/28–32, 41, 61, 70, 71, 72, 118, 119, 146, 147, 175, 195; 701/301, 1, 36, 45, 300; 340/435

[56] References Cited

U.S. PATENT DOCUMENTS

| | | | |
|---|---|---|---|
| 5,479,173 | 12/1995 | Yoshioka et al. .......................... | 342/70 |
| 5,485,155 | 1/1996 | Hibino . | |
| 5,574,463 | 11/1996 | Shirai et al. . | |
| 5,627,511 | 5/1997 | Takagi et al. . | |
| 5,631,639 | 5/1997 | Hibino et al. . | |
| 5,684,473 | 11/1997 | Hibino et al. . | |
| 5,710,565 | 1/1998 | Shirai et al. . | |
| 5,745,870 | 4/1998 | Yamamoto et al. ..................... | 701/301 |
| 5,754,099 | 5/1998 | Nishimura et al. ................... | 342/70 X |
| 5,798,727 | 8/1998 | Shirai et al. ............................. | 342/70 |

FOREIGN PATENT DOCUMENTS

| | | |
|---|---|---|
| 6-59038 | 3/1994 | Japan . |
| 6-148329 | 5/1994 | Japan . |
| 8-248133 | 9/1996 | Japan . |

*Primary Examiner*—Bernarr E. Gregory
*Attorney, Agent, or Firm*—Pillsbury Madison & Sutro LLP

[57] ABSTRACT

An obstacle recognition system for automotive vehicles is provided which is designed to distinguish preceding vehicles from other objects and uses data thereof in intervehicle distance control, for example. The system includes a radar unit and a preceding vehicle determining circuit. The radar unit receives a signal produced by reflection of at least one of transmitted radar signals from an obstacle present in a given obstacle detectable zone to determine a distance to the obstacle and a horizontal and a vertical angle of the obstacle from a preselected reference direction. The preceding vehicle determining circuit includes a two-dimensional shape data producing circuit that produces two-dimensional shape data of the obstacle on a two-dimensional plane in a width-wise and a vertical direction of the system vehicle based on the distance and the horizontal and vertical angles determined by the radar unit and a non-vehicle determining circuit that determines the obstacle as an object other than the vehicle when the two-dimensional shape data of the obstacle lies out of an ordinary vehicle shape range.

9 Claims, 9 Drawing Sheets

OBSTACLE RECOGNITION SYSTEM FOR AUTOMOTIVE VEHICLE

BACKGROUND OF THE INVENTION

1. Technical Field of the Invention

The present invention relates generally to an obstacle recognition system for use in traveling control of automotive vehicles, and more particularly, to an obstacle recognition-system capable of distinguishing vehicles present ahead of a system equipped vehicle from other objects at improved reliability and confidence levels.

2. Background of Related Art

Automotive obstacle recognition systems are known in the art which are designed to emit radar waves such as light waves and milimetric waves and receive a signal reflected from a detectable zone to recognize an object present ahead of the vehicle. As such systems, there have been proposed a collision alarm apparatus which measures the distance to an obstacle such as a preceding vehicle and issues an alarm and a cruise control apparatus which controls the speed of the vehicle to keep the distance to a preceding vehicle. These apparatuses are required to identify desired preceding vehicles as objects for the issuance of alarm and the cruise control with high accuracy. In other words, it is important to eliminate errors that obstacles on the side of a road are recognized as preceding vehicles. To this end, the prior art system distinguishes obstacles on the side of a road from preceding vehicles based on the fact that the obstacles are usually stationary and do not exist on the same lane as a controlled vehicle. Specifically, if a detected object is determined as a stationary object based on a change in position of the obstacle in a width-wise direction of the controlled vehicle and also determined as existing out of the same lane as the controlled vehicle based on the position in the width-wise direction of the controlled vehicle, the possibility that the detected object is an obstacle on either of the sides of a road is determined to be high.

It is, however, difficult to distinguish obstacles on the side of a road from preceding vehicles accurately under a variety of circumstances. For example, when a vehicle enters a curve, it is possible that a road sign provided on the side of a road will be recognized as a stationary vehicle present ahead in error. Further, when a vehicle is traveling before a downhill road or near the end of an uphill road, billboards or road signs located above a road surface which will not be detected when the vehicle is traveling on a level road may be detected as obstacles present ahead of the vehicle. Conversely, when the vehicle is traveling before an uphill road or near the end of a downhill road, the road itself or white lines and cat's-eyes on the road surface may be viewed forward of the vehicle. Therefore, the road itself and the while lines may be recognized as preceding vehicles traveling at a constant interval away from the vehicle, while the cat's-eyes may be recognized as stationary vehicles, which is an inherent performance limitation of the prior art systems designed to detect obstacles in two-dimensional direction: width-wise direction and longitudinal direction of the vehicle using a one-dimensional scan over a given angle in the width-wise direction of the vehicle.

SUMMARY OF THE INVENTION

It is therefore a principal object of the present invention to avoid the disadvantages of the prior art.

It is another object of the present invention to provide an obstacle recognition system for automotive vehicles capable of recognizing obstacles present in three-dimensional direction of a system-equipped vehicle with high reliability and confidence levels.

According to one aspect of the present invention, there is provided an obstacle recognition system for vehicles which comprises: (a) a radar unit that transmits radar signals over a given obstacle detectable zone ranging a preselected width-wise and a vertical angle of a system vehicle equipped with this system, the radar unit receiving a signal produced by reflection of at least one of the transmitted radar signals from an obstacle present in the given obstacle detectable zone to determine a distance to the obstacle and a horizontal and a vertical angle of the obstacle from a preselected reference direction; and (b) a vehicle determining means that determines whether the obstacle tracked by the radar unit is a vehicle or another object. The vehicle determining means includes (a) a height determining means that determines a height of a given portion of the obstacle based on the distance and the horizontal and vertical angles determined by the radar unit and (b) a non-vehicle determining means that determines the obstacle as an object other than the vehicle when the height of the given portion of the obstacle determined by the height determining means falls within a given height range at least one time within a predetermined period of time.

In the preferred mode of the invention, the vehicle determining means also includes obstacle movement determining means for monitoring movement of the tracked obstacle to determine whether the obstacle is a moving object or a stationary object. The non-vehicle determining means determines the obstacle as the object other than the vehicle when it is determined by the vehicle determining means that the obstacle is the stationary object and when the height of the given portion of the obstacle falls within the given height range at least one time within the predetermined period of time.

According to another aspect of the present invention, there is provided an obstacle recognition system for vehicles which comprises: (a) a radar unit that transmits radar signals over a given obstacle detectable zone ranging a preselected width-wise and a vertical angle of a system vehicle equipped with this system, the radar unit receiving a signal produced by reflection of at least one of the transmitted radar signals from an obstacle present in the given obstacle detectable zone to determine a distance to the obstacle and a horizontal and a vertical angle of the obstacle from a preselected reference direction; and (b) a vehicle determining means that determines whether the obstacle tracked by the radar unit is a vehicle or another object. The vehicle determining means includes (a) a two-dimensional shape data producing means that produces two-dimensional shape data of the obstacle on a two-dimensional plane in a width-wise and a vertical direction of the system vehicle based on the distance and the horizontal and vertical angles determined by the radar unit and (b) a non-vehicle determining means that determines the obstacle as an object other than the vehicle when the two-dimensional shape data of the obstacle produced by the two-dimensional shape data determining means lies out of an ordinary vehicle shape range.

In the preferred mode of the invention, the non-vehicle determining means determines the obstacle as the object other than the vehicle when a width ratio of a width of an upper portion to a width of a lower portion of the obstacle on the two-dimensional plane lies out of a given width ratio range. The non-vehicle determining means also determines the obstacle as the object other than the vehicle when a ratio of a height to a width of the obstacle on the two-dimensional plane lies out of a given height-to-width ratio range.

The non-vehicle determining means further determines the obstacle as the object other than the vehicle when a maximum width of the obstacle is lies out of a given maximum vehicle width range.

The vehicle determining means also includes an obstacle movement determining means that monitors movement of the tracked obstacle to determine whether the obstacle is a moving object or a stationary object. The non-vehicle determining means determines the obstacle as the object other than the vehicle when it is determined by the vehicle determining means that the obstacle is the stationary object and when the width ratio lies out of a given width ratio range or when the ratio of the height to the width of the obstacle on the two-dimensional plane lies out of a given height-to-width ratio range.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

An obstacle recognition system of the invention will be described below with reference to the drawings, taking an automotive collision avoidance system as an example.

Figure 1:
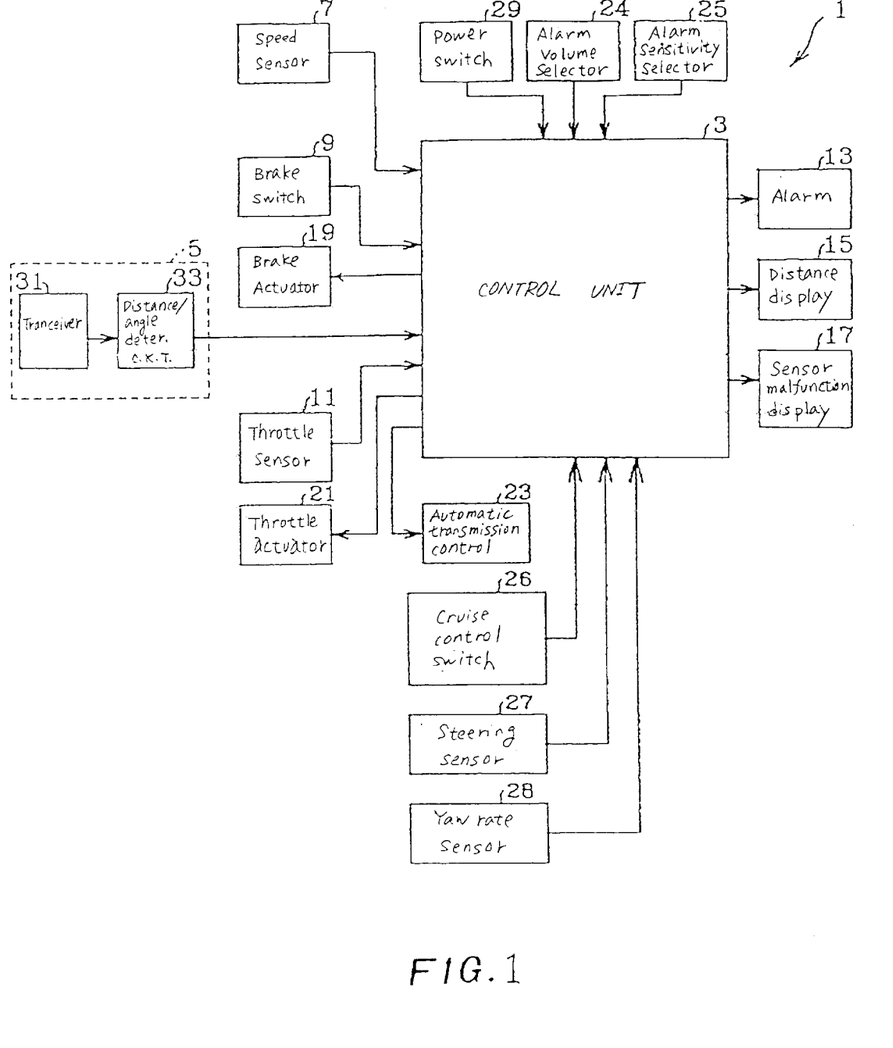
FIG. 1 is a block diagram which shows an automotive collision avoidance system in which an obstacle recognition system of the invention is installed.

FIG. 1 shows the automotive collision avoidance system 1 which is designed to track obstacles present ahead of an automotive vehicle equipped with this system (hereinafter, referred to as a system vehicle) for raising an alarm to inform a vehicle operator of the possibility of collision when a distance between the obstacle and the system vehicle reaches a warning distance and to control the speed of the system vehicle so as to follow a selected preceding vehicle at a constant intervehicle distance.

The automotive collision avoidance system 1 includes a control unit 3 provided with a microcomputer, an input/output interface circuit, driving circuits, and detection circuits which can be of any known arrangements, and explanation thereof in detail will be omitted here.

The control unit 3 receives detection signals outputted from a distance/azimuth measuring device 5, a speed sensor 7, a brake switch 9, and a throttle opening sensor 11, and provides control signals to an alarm sound generator 13, a distance display 15, a sensor malfunction display 17, a brake actuator 19, a throttle actuator 21, and an automatic transmission control unit 23.

The automotive collision avoidance system 1 further includes an alarm volume selector 24, an alarm sensitivity selector 25, a power switch 29, a cruise control switch 26, a steering sensor 27, and a yaw rate sensor 28. The alarm volume selector 24 is designed to manually adjust the volume on the alarm sound generator 13. The alarm sensitivity selector 25 is designed to manually adjust the sensitivity of an alarm decision operation. The power switch 29 is designed to be turned on manually or in response to activation of an ignition switch to supply the power to the control unit 3. The cruise control switch 26 is designed to manually turn on the cruise control. The steering sensor 27 measures a steered angle of a steering wheel of the system vehicle and provides a signal indicative thereof to the control unit 3. The yaw rate sensor 28 measures a yaw rate of the vehicle body and provides a signal indicative thereof to the control unit 3.

Figure 3:
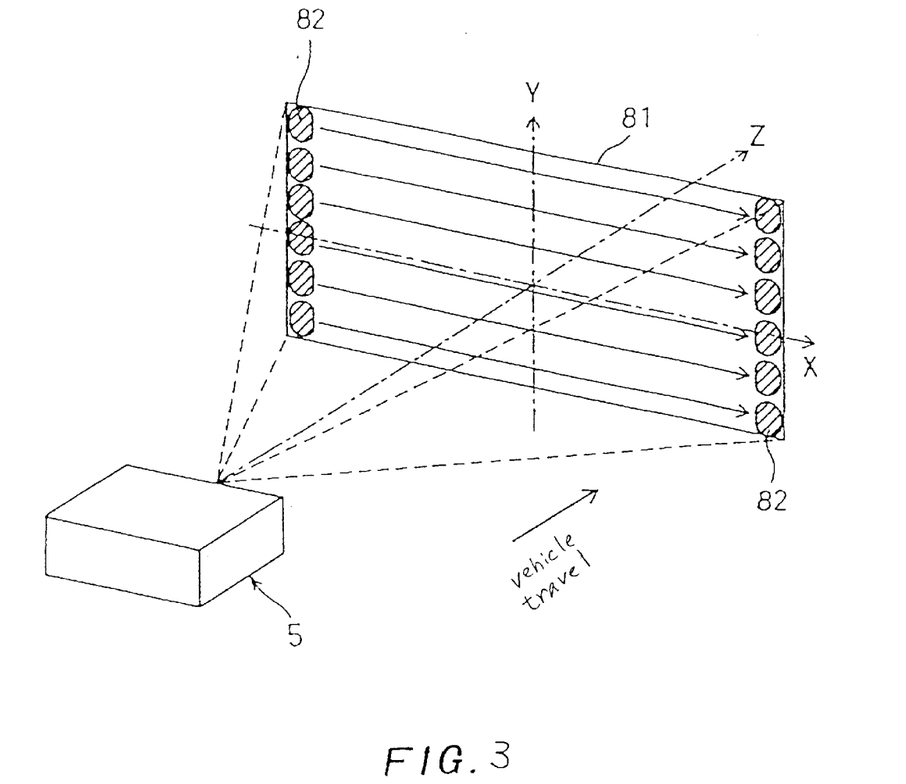
FIG. 3 is a perspective view which shows an obstacle detectable zone scanned by a radar unit.

The distance/azimuth measuring device 5 is implemented with a radar unit which includes a transceiver 31 and a distance/angle determining circuit 33. The transceiver 31 is provided with a scanner which transmits a laser beam in cycles in horizontal and vertical directions of the system vehicle to scan a forward detectable range defined by given horizontal and vertical angles and receives a beam reflected from an object or target present ahead of the system vehicle. The distance/angle determining circuit 33 determines a relative speed between the system vehicle and the target, a distance to the target, and coordinates of the target based on the length of time between the transmission of the laser beam and reception thereof. An example of a scan pattern of the laser beam emitted by the transceiver 31 is shown in FIG. 3. Each hatched portions 82 indicates a cross section of the laser beam emitted over the detectable range 81. The laser beam may alternatively be oval or rectangular in cross section. The distance/azimuth measuring device 5 can be of any arrangement other than a scanner capable of measuring the distance to a target in two-dimensional direction and may use a microwave or a supersonic wave.

In FIG. 3, if the central optical axis of the transceiver 31 is defined as Z-axis, an X-Y area or detectable zone 81 defined perpendicular to the Z-axis is scanned. In this embodiment, X-axis indicates the direction in which scanning lines extend horizontally, while Y-axis indicates an elevation of the detectable zone 81. The X-Y area is defined by 0.15°×105 laser pulses=16° in the X-axis direction and 0.7°×6 scanning lines=4°. The scan is performed from left to right and from top to bottom of the detectable zone 81. In practice, laser pulses are first scanned along the uppermost scanning line in the X-axis direction. Upon reaching the right end of the uppermost scanning line, the laser pulses are next scanned along the second scanning line immediately below the uppermost scanning line. In this way, the scans are performed up to the sixth scanning line to derive 105 laser pulses×6 scanning lines=630 data components in the transceiver 31. In FIG. 3, the fourth scanning is located flush with the vehicle (i.e., the central optical axis of the distance/azimuth measuring device 5).

The distance/angle determining circuit 33 receives the 630 components from the transceiver 31 to provide data signals indicative of horizontal and vertical scanning angles θx and θy and the distance r to a tracked object. The horizontal angle θx is the angle which a line of an output laser beam projected onto the X-Z plane makes with the Z-axis. The vertical scanning angle θy is the angle which the output laser beam makes with the X-Z plane.

The control unit 3 is responsive to the data signals from the distance/azimuth measuring scanner 5 to determine if a tracked obstacle such as a vehicle traveling ahead of the system vehicle, a parked vehicle, a guard rail, or a pole installed on the side of a road lies within an warning zone for a preselected period of time or not. If so, the control unit 3 concludes that there is a high possibility of collision, and raises an alarm to the vehicle operator through the alarm sound generator 13. In addition, the control unit 3 may perform cruise control that controls the brake actuator 19, the throttle actuator 21, and/or the automatic transmission control unit 23 to regulate the speed of the system vehicle according to the status of the tracked obstacle.

Figure 2:
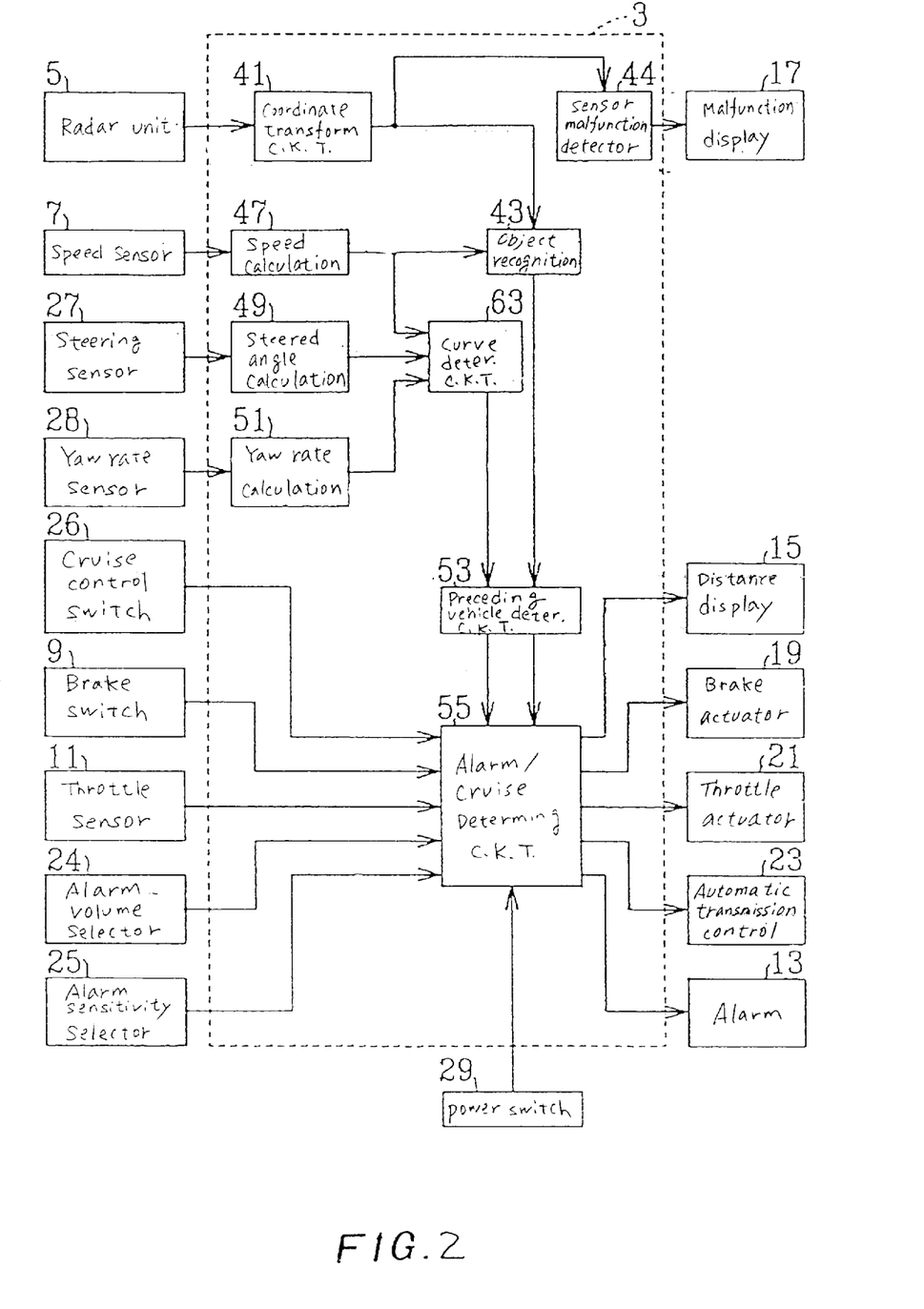
FIG. 2 is a block diagram which shows a circuit arrangement of a control unit of a collision avoidance system.

The control unit 3, as shown in FIG. 2, includes a spherical-to-rectangular coordinate transformation circuit 41, a sensor malfunction determining circuit 44, an object recognition circuit 43, a speed determining circuit 47, a steered angle determining circuit 49, a yaw rate determining circuit 51, a radius-of-curvature determining circuit 63, a preceding vehicle decision circuit 53, and an alarm/cruise determining circuit 55.

The spherical-to-rectangular coordinate transformation circuit 41 receives from the distance measuring scanner 5 data on the horizontal and vertical scanning angles θx and θy and the distance r to a tracked object and transfers it to a point in an X-Y-Z rectangular coordinate system whose origin (0, 0, 0) is defined on the system vehicle. The sensor malfunction determining circuit 44 determines whether values transferred in the X-Y-Z coordinate system represent normal values or not, and provides a signal indicative thereof to the sensor malfunction display 17.

The object recognition circuit 43 determines the type of a tracked obstacle, coordinates (x, y, z) of central position of the obstacle, the size data (W, D, H) on the obstacle, and the shape data on the obstacle based on the speed V of the system vehicle, the relative speed between the system vehicle and the obstacle, and the x-, y-, and z-coordinates determined by the spherical-to-rectangular coordinate transformation circuit 41. The determination of the type of the obstacle is made to determine whether the obstacle is a moving object or a stationary one based on the vehicle speed V and the relative speed. When a plurality of obstacles are detected, ones which will disturb traveling of the system vehicle are selected, and distances to the selected obstacles are indicated through the distance display 15. The size data (W, D, H) indicates the length of sides of a minimum rectangular parallelepiped containing therein the obstacle geometrically (i.e., width, depth, and height of the rectangular parallelepiped). The shape data indicates parameters other than the size data (W, D, H), for example, an upper width Wu and a lower width Wd of the obstacle on the X-Y coordinate plane.

The speed determining circuit 47 is responsive to a signal from the speed sensor 7 to determine the speed Vn of the system vehicle and provides a signal indicative thereof to the object recognition circuit 43. The object recognition circuit 43 monitors a variation in central position of the tracked obstacle per unit time to determine the relative speed between the system vehicle and the obstacle based on the vehicle speed Vn determined by the speed determining circuit 47. The relative speed is represented by the vector sum of x-, y-, and x-axis components (Vx, Vy, Vz).

The steered angle determining circuit 47 determines the steered angle of the steering wheel of the system vehicle based on an output from the steering sensor 27 and provides a signal indicative thereof to the radius-of-curvature determining circuit 63. The yaw rate determining circuit 51 determines the yaw rate of the system vehicle based on an output from the yaw rate sensor 28 and provides a signal indicative thereof to the radius-of-curvature determining circuit 63.

The radius-of-curvature determining circuit 63 uses the vehicle speed Vn determined by the vehicle speed determining circuit 47, the steered angle determined by the steered angle determining circuit 49, and the yaw rate determined by the yaw rate determining circuit 51 to calculate the radius of curvature R of a road on which the system vehicle is traveling. The preceding vehicle decision circuit 53 determines whether the tracked obstacle is a preceding vehicle traveling ahead of the system vehicle on the same traffic lane or not based on the radius of curvature R, the type of the obstacle, the coordinates (x, y, z) of the central position of the obstacle, the size data (W, D, H), the relative speed components (Vx, Vy, Vz) and determines the distance Z to and relative speed Vz of the obstacle if determined as a preceding vehicle.

The alarm/cruise determining circuit 55 determines in an alarm mode whether an alarm is to be raised or not or determines in a cruise mode the contents of speed control based on the distance Z to the preceding vehicle, the relative speed Vz, the vehicle speed Vn, the acceleration of the preceding vehicle, a brake pedal effort detected by the brake switch 9, an opening degree of the throttle sensed by the throttle opening sensor 11, a value of sensitivity set by the alarm sensitivity selector 25. When it has been concluded that an alarm needs to be raised, the alarm/cruise determining circuit 55 provides an alarm generating signal to the alarm sound generator 13. Alternatively, the alarm/cruise determining circuit 55, in the cruise mode, provides control signals to the automatic transmission control unit 23, the brake actuator 19, and the throttle actuator 21 to perform given cruise control.

Figure 4:
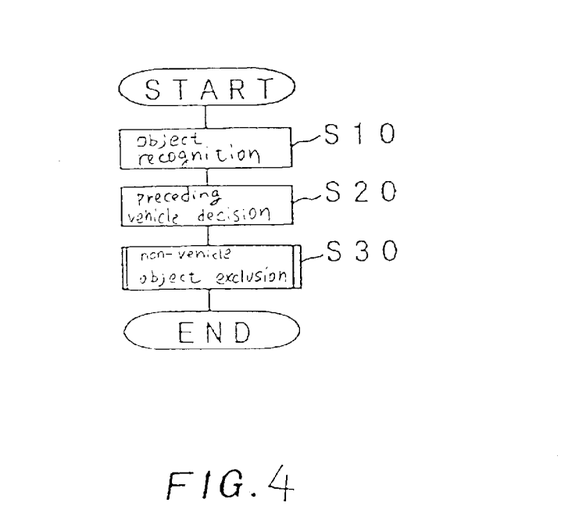
FIG. 4 is a flowchart of a program performed by an obstacle recognition system.

FIG. 4 shows a flowchart of an object recognition program performed by the control unit 3 in the so-called intervehicle distance control for determining whether a tracked object is a preceding vehicle traveling on the same traffic lane as that of the system vehicle or not.

After entering the program, the routine proceeds to step 10 wherein using 630 data components (=105 laser pulses×6 scanning lines) derived in the receiver 31 of the distance/azimuth measuring device 5 by scanning the detectable zone 81 defined by a horizontal angle of 16° (=0.15°×105 laser pulses) and a vertical angle of 4°(=0.7°×6 scanning lines), the distance/angle determining circuit 33 provides data signals indicative of horizontal and vertical scanning angles θx and θy and the distance r to a tracked obstacle which are, in turn, transformed by the spherical-to-rectangular coordinate transformation circuit 41 into coordinates (x, y, z) in the rectangular X-Y-Z coordinate system. The object recognition circuit 43 uses the coordinate data inputted from the spherical-to-rectangular coordinate transformation circuit 41 to determine the type of the obstacle, the coordinates (x, y, z) of central position of the obstacle, the size data CV, D, H), the shape data, and the relative speed components (Vx, Vy, Vz) of the obstacle. The relative speed components (Vx, Vy, Vz) are, as described above, derived based on variations in coordinates (x, y, z) of central position of the obstacle per unit time, respectively. For the type of the obstacle, if the system vehicle is traveling, but a relative position of the obstacle (i.e., the relative speed of the obstacle) hardly changes, then the obstacle is identified as a moving object. Additionally, if the obstacle is moving away from the system vehicle, that is, the relative speed of the obstacle is increasing, then the obstacle is also identified as a moving object. If the relative position of the obstacle is approaching the system vehicle at the speed equal in absolute value to the vehicle speed Vn of the system vehicle, then the obstacle is identified as a stationary object.

The routine proceeds to step 20 wherein it is determined whether the obstacle is a preceding vehicle or not in the following manner. First, the radius of curvature R of a road on which the system vehicle is now traveling is determined in the radius-of curvature determining circuit 63. A same lane probability that the obstacle determined in step 10 exists in the same traffic lane as the system vehicle is determined using the radius of curvature R and the position of the obstacle on the X-Z plane in FIG. 3. When a plurality of obstacles are detected by the distance/azimuth measuring circuit 5, the same lane probability of each obstacle is determined. Next, from among the obstacles having the same lane probabilities of more than a preselected value, a target preceding vehicle(s) is selected. The determination of the same lane probability and selection of the target preceding vehicle may be made in a manner as taught in U.S. Pat. No. 5,710,565 (corresponding to German Patent Application laid open on Oct. 10, 1996 under DE196 14 061 A1), issued on Jan. 20, 1998, assigned to the same assignee as that of this application, disclosure of which is incorporated herein by reference.

The determination in step 20 has a possibility that some non-preceding vehicle on or above the road is determined as a preceding vehicle. For example, a road itself or objects disposed on or above a lane on which the system vehicle is now traveling such as road signs, overpasses, white lines, and cat's eyes on a white line may be determined as preceding vehicles in error. Step 30, as discussed below, excludes such objects from targets determined as preceding vehicles.

Figure 5:
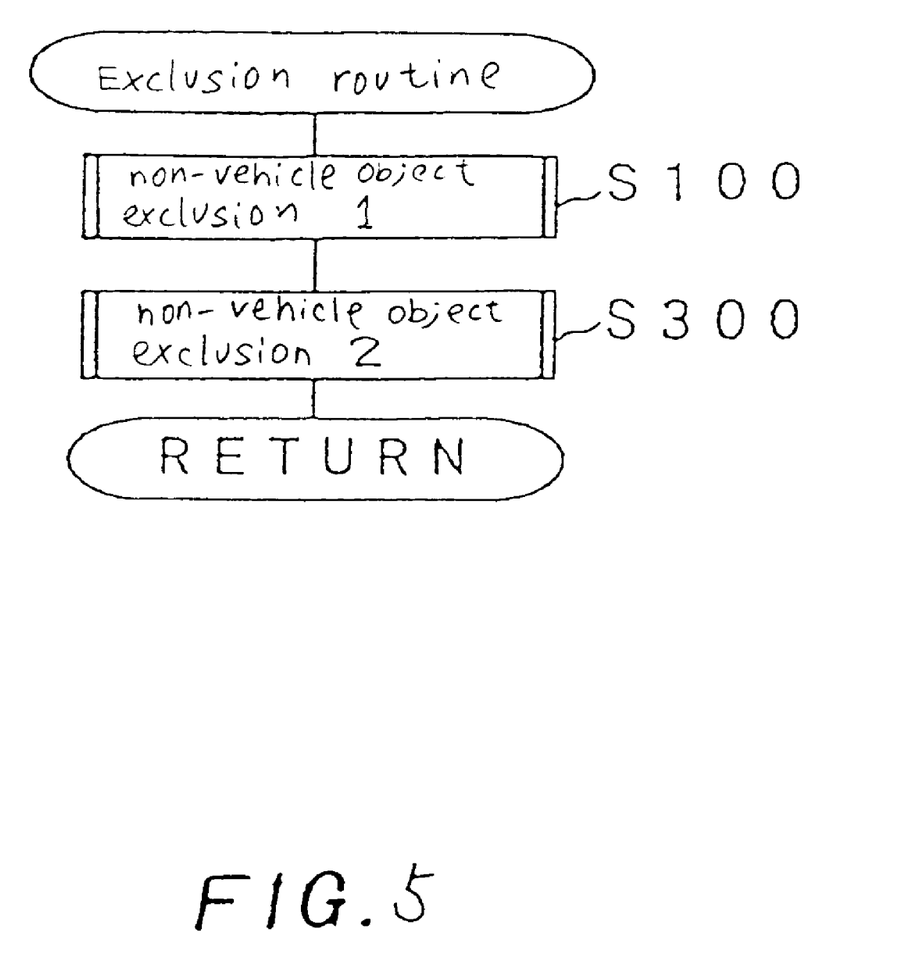
FIG. 5 is a flowchart of a program to exclude non-vehicle objects from obstacles tracked by a radar unit.

Upon entering step 30, the routine proceeds to step 100 in FIG. 5 to execute a first non-preceding vehicle excluding sub-program to exclude non-preceding vehicles from all obstacles tracked by the distance/azimuth measuring device 5 in terms of the height of tracked obstacles. After the non-preceding vehicles are excluded from the obstacles in step 100, the routine proceeds to step 300 to execute a second non-preceding vehicle excluding sub-program to exclude non-preceding vehicles from all obstacles tracked by the distance/azimuth measuring device 5 in terms of the shape of the tracked obstacle.

Figure 6:
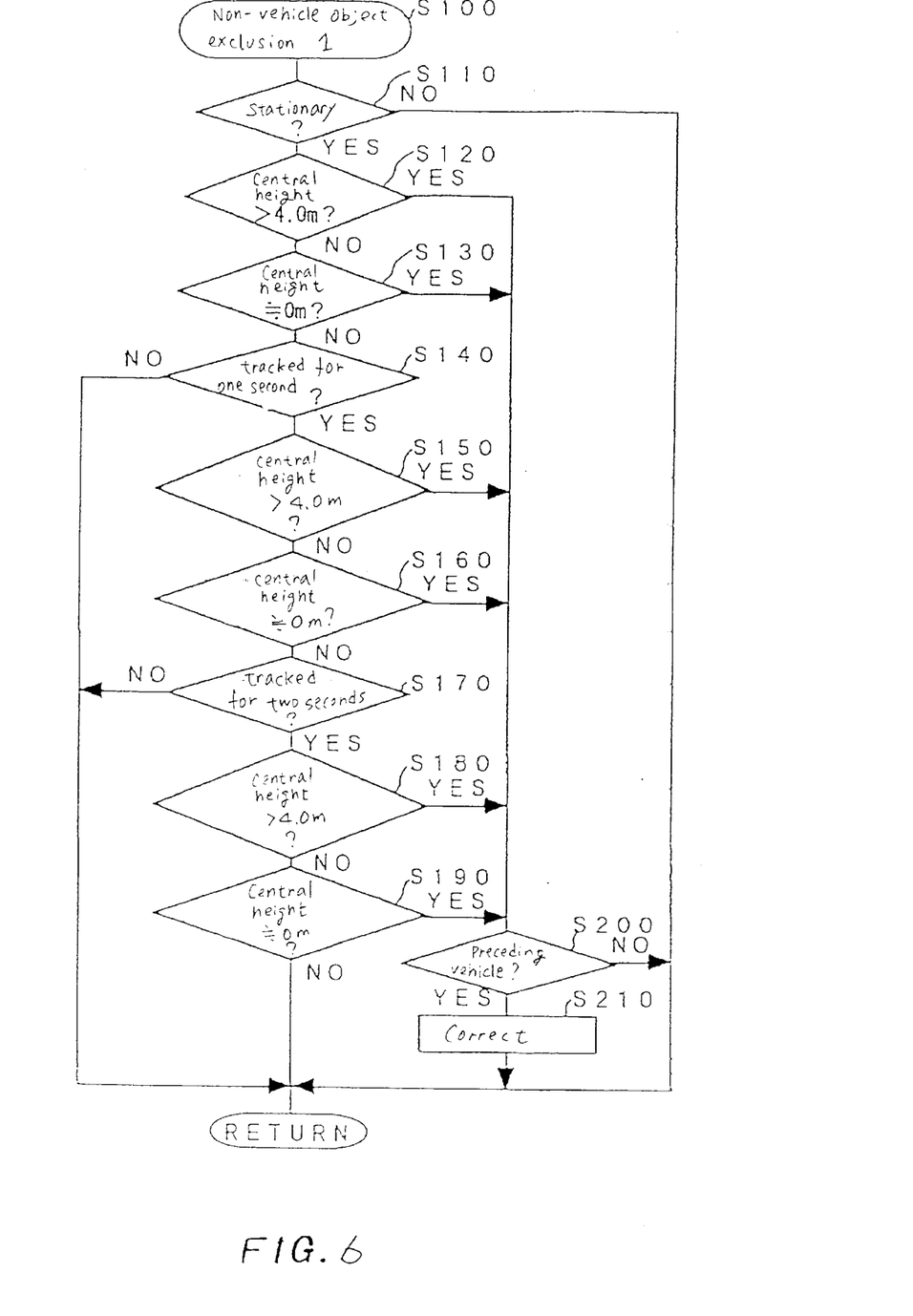
FIG. 6 is a flowchart of a first non-preceding vehicle excluding sub-program executed in the program of FIG. 5.

FIG. 6 shows the first non-preceding vehicle excluding program.

First, in step 110, it is determined whether each tracked obstacle is at rest or not based on the decision in step 10 in FIG. 4. This determination is based on the fact that most of obstacles determined as preceding vehicles in error are usually stationary objects located on or above the road. If a NO answer is obtained meaning that the obstacle is moving, that is, that the preceding vehicle is traveling, then the routine terminates without executing step 120 and later steps. This prevents a traveling preceding vehicle from being determined as a non-preceding vehicle in error at the beginning and end of a slope, for example. Alternatively, if a YES answer is obtained in step 110, then the routine proceeds to step 120 wherein it is determined whether the height of the center of the obstacle from a road surface is greater than 4.0 m or not. If a NO answer is obtained, then the routine proceeds to step 130 wherein it is determined whether the central height of the obstacle is nearly 0 m or not. If a YES answer is obtained in either of steps 120 and 130, then the routine proceeds to step 200 wherein it is determined whether the obstacle has already been determined as a preceding vehicle in step 20 in FIG. 4 or not. If a YES answer is obtained, then the routine proceeds to step 210 wherein the determination in step 20 is corrected, and the obstacle is recognized as a non-preceding vehicle. The routine then terminates.

The central height of the obstacle to be used in determinations in steps 120 and 130 is calculated based on the coordinates (x, y, z) of the central position of the obstacle derived in the object recognition circuit 43. The reason that the obstacle is determined as a non-preceding vehicle when the central height of the obstacle is greater than 4.0 m or nearly equal to 0 m is because the central heights of typical vehicles are hardly equal to 0 m or greater than 4.0 m. Specifically, in Japan, typical trucks or trailers have a maximum height of 3.8 m, and the bottom of vehicles is spaced apart from a road surface by several centimeters. It is, thus, possible to determine the obstacle as a non-preceding vehicle when the central height thereof is greater than 4.0 m or nearly equal to 0 m.

If a NO answer is obtained in step 130 meaning that the central height of the obstacle lies within a range from 0 to 4.0 m, then the routine proceeds to step 140 to refer to height data on the same obstacle derived in previous program execution cycles. This is because when the system vehicle is traveling before a downhill road or near the end of an uphill road, overhead billboards or road signs located 4 m above a road surface, which should not be tracked by the distance/azimuth measuring circuit 5 when the system vehicle is traveling on a level road, will be viewed in front of the system vehicle and recognized as preceding vehicles in error. Further, when the system vehicle is traveling before an uphill road or near the end of a downhill road, the road itself, white lines on the road, or cat's eyes mounted on the white line will appear in front of the system vehicle and recognized as preceding vehicles in error. Therefore, such erroneous recognition is corrected using the previous height data as discussed below.

In step 140, it is determined whether the obstacle continues to be tracked for one second or not. If a NO answer is obtained, then the routine terminates. Alternatively, if a YES answer is obtained, then the routine proceeds to step 150 wherein it is determined whether the central height of the obstacle when tracked one second before is greater than 4.0 m or not. If a NO answer is obtained, then the routine proceeds to step 160 wherein it is determined whether the central height of the obstacle when tracked one second before is nearly equal to 0 m or not. If a YES answer is obtained in either of steps 150 and 160, then the routine proceeds to step 200.

If a NO answer is obtained in step 160, then the routine proceeds to step 170 wherein it is determined whether the obstacle continues to be tracked for two seconds or not. If a YES answer is obtained, then the routine proceeds to step 180 wherein it is determined whether the central height of the obstacle when tracked two seconds before is greater than 4.0 m or not. If a NO answer is obtained, then the routine proceeds to step 190 wherein it is determined whether the central height of the obstacle when tracked two seconds before is nearly equal to 0 m or not. If a NO answer is obtained, then the routine terminates. Alternatively, if a YES answer is obtained in either of steps 180 and 190, then the routine proceeds to step 200.

After termination of the sub-program in FIG. 4, the routine proceeds to step 300 in FIG. 5. The sub-program in step 300 is performed for all the tracked obstacles.

Figure 7:
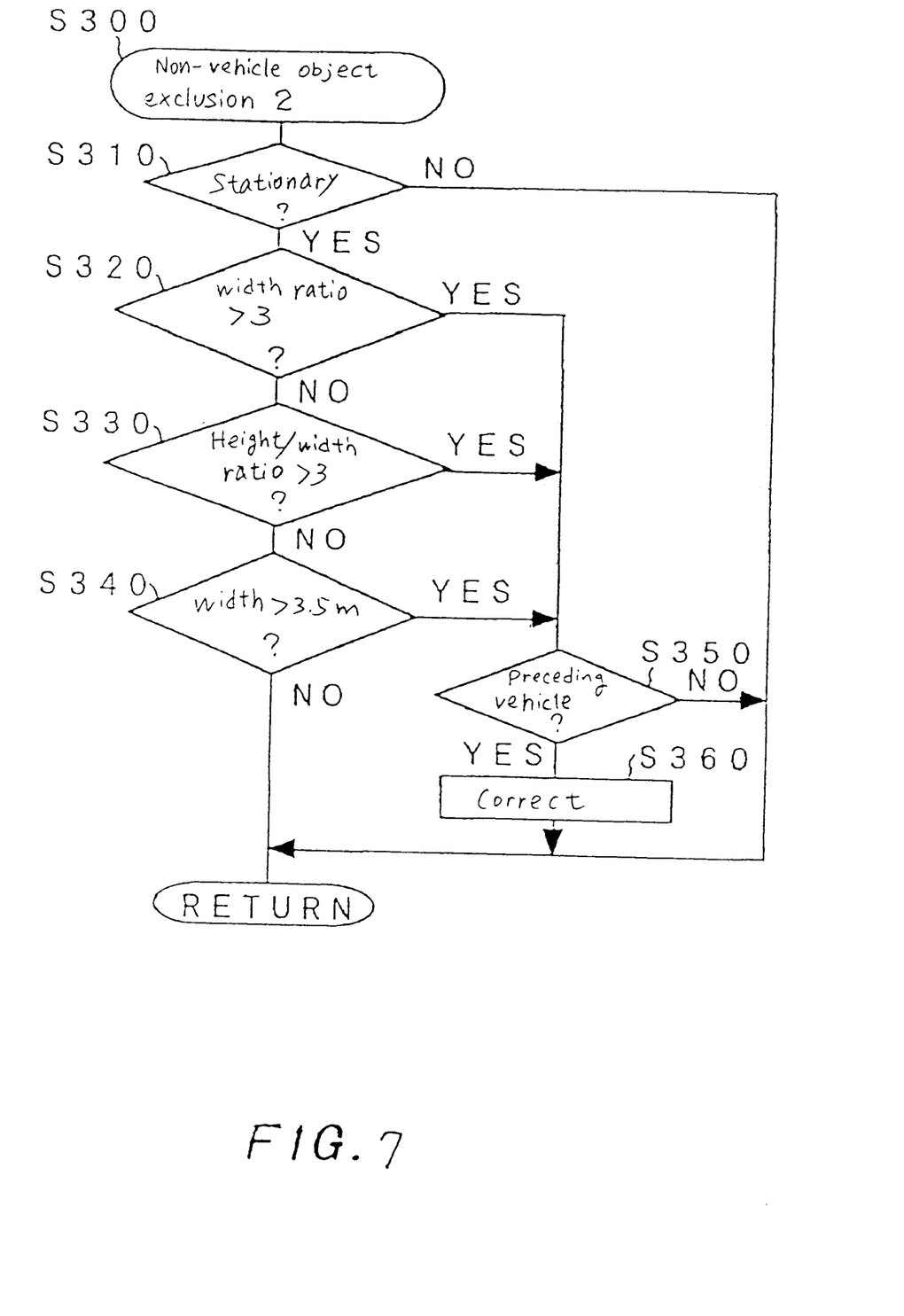
FIG. 7 is a flowchart of a second non-preceding vehicle excluding sub-program executed in the program of FIG. 5.
Figure 8A:
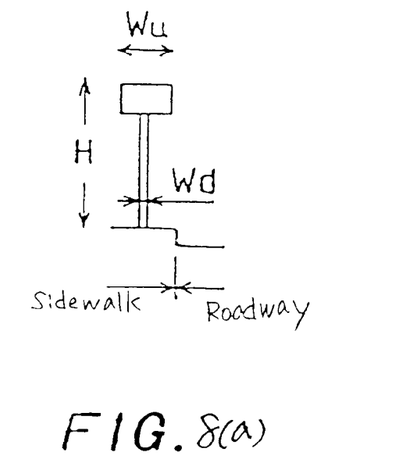
FIGS. 8(a), 8(b), 8(c), and 8(d) show ordinary roadside road signs.
Figure 8B:
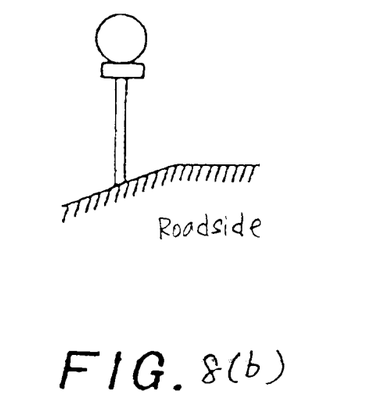
Figure 8C:
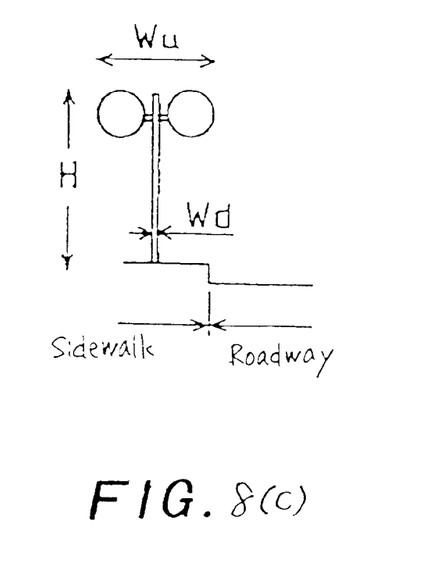
Figure 8D:
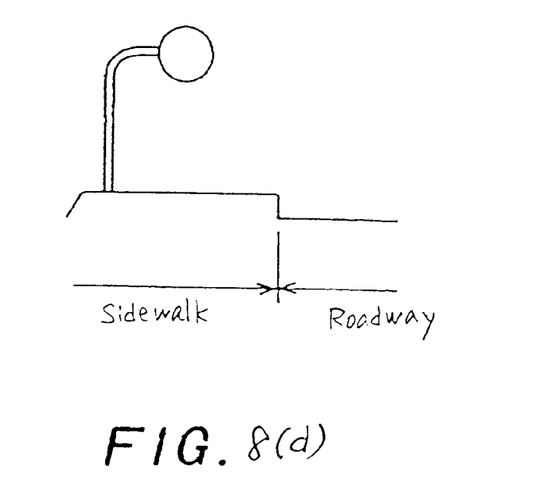

First, in step 310, it is determined whether the tracked obstacle is at rest or not based on the decision in step 10 in FIG. 4. If a NO answer is obtained, then the routine terminates. Alternatively, if a YES answer is obtained, then the routine proceeds to step 320 wherein it is determined whether a ratio (Wu/Wd) of the upper width Wu of an upper end of the obstacle on the X-Y plane in FIG. 3 to the lower width Wd of a lower end thereof is greater than three (3) or not. If a NO answer is obtained, then the routine proceeds to step 330 wherein it is determined whether a ratio (H/W) of the height H to the width W of the obstacle is greater than three (3) or not. If a NO answer is obtained, then the routine proceeds to step 340 wherein it is determined whether a maximum width W of the obstacle is greater than 3.5 m or not. If a NO answer is obtained, then the routine terminates. Alternatively, if a YES answer is obtained in any of steps 320, 330, and 340, then the routine proceeds to step 350 wherein it is determined whether the obstacle has already been determined as a preceding vehicle in step 20 in FIG. 4 or not. If a YES answer is obtained, then the routine proceeds to step 360 wherein the determination in step 20 is corrected, and the obstacle is recognized as a non-preceding vehicle. The routine then terminates.

The determinations in steps 320, 330, and 340 are, as can be seen from the above, made for determining whether the shape of the obstacle falls within a range of shapes of ordinary vehicles or not. The reason that when it is determined in step 320 that the width ratio (Wu/Wd) is greater than 3, the obstacle is recognized as a preceding vehicle is as follows. Usually, road signs are, as shown in FIGS. 8(a) to 8(d) and FIGS. 9(a) to 9(f), installed on upper ends of support poles and have, in most cases, the width ratio (Wu/Wd) of 3 or more which ordinary automotive vehicles never have. The use of the width ratio (Wu/Wd) in determination in step 320, thus, allows ordinary automotive vehicles to be distinguished from non-vehicle objects such as road signs.

Figure 9A:
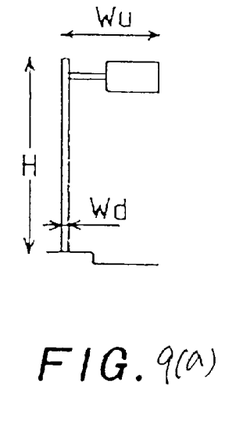
FIGS. 9(a), 9(b), 9(c), 9(d), 9(e), and 9(f) show ordinary overhung road signs.
Figure 9B:
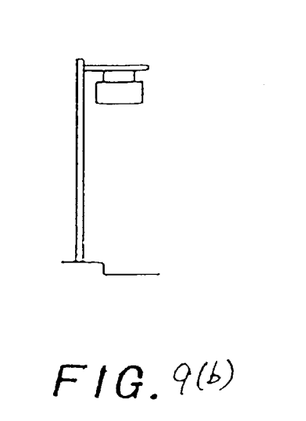
Figure 9C:
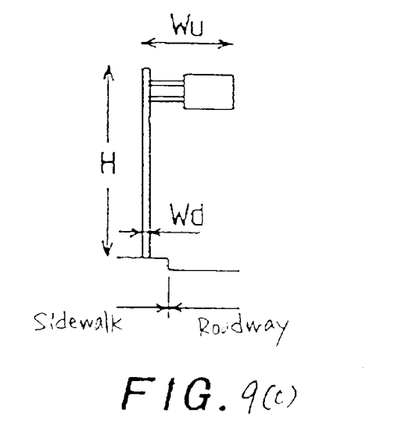
Figure 9D:
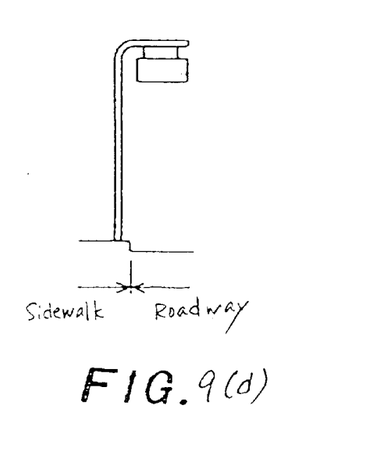

The reason that when it is determined in step 330 that the height-to-width ratio (H/W) is greater than 3, the obstacle is recognized as a preceding vehicle is as follows. Most of the road signs, as shown in FIGS. 8(a) to 8(d) and FIGS. 9(a) to 9(f), have a height of 2 to 3 m or more, but the width thereof is usually small, so that the height-to-width ratio (H/W) will be greater than 3. For example, the inverse L-shaped overhung road signs, as shown in FIGS. 9(a) and 9(b), and the L-shaped overhung road sign, as shown in FIG. 9(c), are usually located 5 m above a road surface for avoiding interference with vehicles traveling on the roadway. Thus, even when the width of the road signs is, for example, 1 m, the height-to-width ratio (H/W) will be 5 which is greater than 3 and which ordinary automotive vehicles never have. The use of the height-to-width ratio (H/W) in determination in step 330, thus, allows ordinary automotive vehicles to be distinguished from non-vehicle objects such as road signs.

Figure 9E:
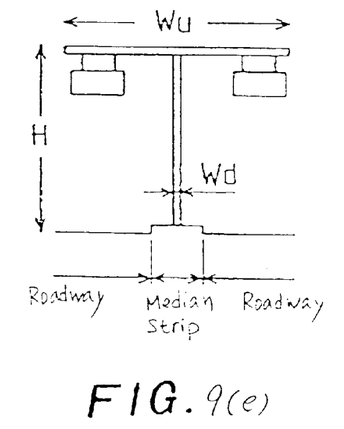
Figure 9F:
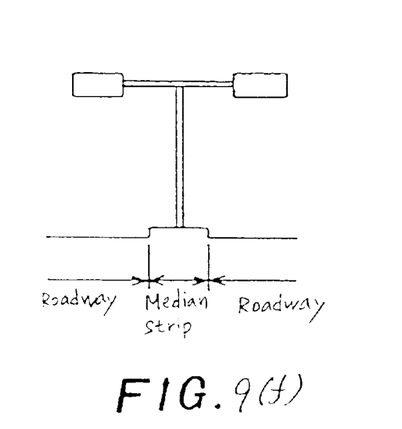

Most of ordinary road signs can be distinguished from the automotive vehicles by either of the determinations in steps 320 and 330, but this embodiment uses the two determinations in steps 320 and 330 to improve the accuracy of discrimination between the automotive vehicles and non-vehicle objects. For example, the T-shaped road signs, as shown in FIGS. 9(e) and 9(f), have a height-to-width of close to one (1) and difficult to distinguish from the automotive vehicle only in the determination in step 330, but it have an upper-to-lower width ratio (Wu/Wd) of 3 or more and can be distinguished from the automotive vehicle by use of the determination in step 320.

Figure 10A:
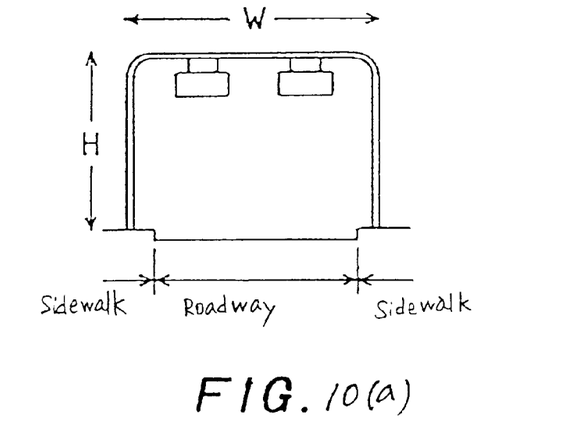
FIGS. 10(a), 10(b), and 10(c) show road signs bridging over the roadway.
Figure 10B:
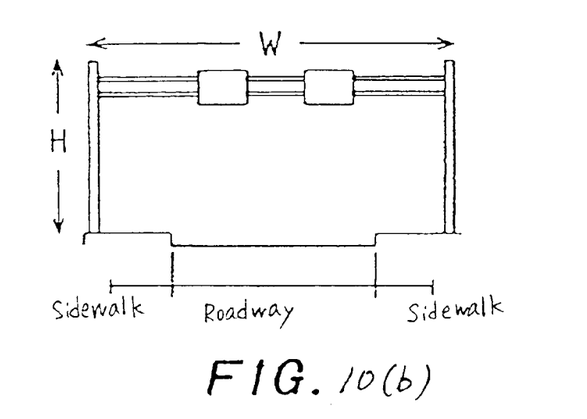
Figure 10C:
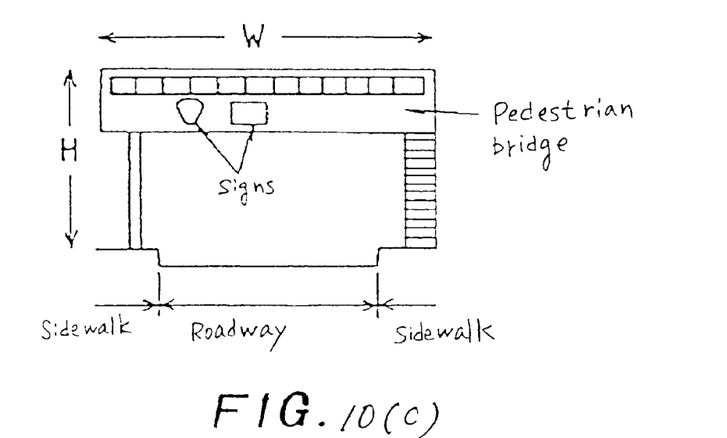

The reason that when it is determined in step 340 that the width W is greater than 5 m, the obstacle is recognized as a preceding vehicle is as follows. Special road signs such as ones, as shown in FIGS. 10(a) and 10(b), mounted on support poles bridging over the roadway and, as shown in FIG. 10(c), attached to a side wall of a pedestrian bridge have a height-to-width ratio (H/W) of less than one (1). For the upper-to-lower width ratio (Wu/Wd), it is difficult to determine which part of the road sign is a lower width, thus resulting in a negative answer in either of steps 320 and 330. Further, for the T-shaped road signs shown in FIGS. 9(e) and 9(f), only upper portions hanging over the roadway may be recognized as obstacles. In this case, they are difficult to exclude from the targets as determined as preceding vehicles in the determinations in steps 320 and 330. For these reasons, step 340 is executed to compare the width of the obstacle with a reference value (3.5 m) which ordinary automotive vehicles never have to recognize the obstacle as a non-preceding vehicle if a maximum width thereof is greater than the reference value. For example, the road signs, as shown in FIGS. 10(a), 10(b), and 10(c), have maximum widths which exceed the width of one traffic lane and which is greater than 3.5 m.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, criteria of the width ratio (Wu/Wd) and the height-to width ratio (H/W) used in determinations in steps 320 and 330 are not always limited to three (3) and may alternatively be 2.5. Specifically, the criteria of the width ratio (Wu/Wd) and the height-to width ratio (H/W) may be any values which ordinary automotive vehicles never have. Further, after step 190 in FIG. 6, a step which uses height data derived three or four seconds earlier may also be provided to improve the accuracy of non-vehicle determination in steps 200 and 210. The use of old height data, however, makes it difficult to identify targets. The use of height data derived up to two seconds earlier is found experimentally to be preferable.

What is claimed is:

1. An obstacle recognition system for vehicles comprising:

a radar unit that transmits radar signals over a given obstacle detectable zone ranging a preselected widthwise and a vertical angle of a system vehicle equipped with this system, said radar unit receiving a signal produced by reflection of at least one of the transmitted radar signals from an obstacle present in the given obstacle detectable zone to determine a distance to the obstacle and a horizontal and a vertical angle of the obstacle from a preselected reference direction; and vehicle determining means for determining whether the obstacle tracked by said radar unit is a vehicle or another object, said vehicle determining means including height determining means for determining a height of a given portion of the obstacle based on the distance and the horizontal and vertical angles determined by said radar unit, and non-vehicle determining means for determining the obstacle as an object other than the vehicle when the height of the given portion of the obstacle determined by said height determining means falls within a given height range at least one time within a predetermined period of time.

2. An obstacle recognition system as set forth in claim 1, wherein said vehicle determining means also includes obstacle movement determining means for monitoring movement of the tracked obstacle to determine whether the obstacle is a moving object or a stationary object, and wherein said non-vehicle determining means determines the obstacle as the object other than the vehicle when it is determined by said vehicle determining means that the obstacle is the stationary object and when the height of the given portion of the obstacle falls within the given height range at least one time within the predetermined period of time.

3. An obstacle recognition system for vehicles comprising:

a radar unit that transmits radar signals over a given obstacle detectable zone ranging a preselected width-wise and a vertical angle of a system vehicle equipped with this system, said radar unit receiving a signal produced by reflection of at least one of the transmitted radar signals from an obstacle present in the given obstacle detectable zone to determine a distance to the obstacle and a horizontal and a vertical angle of the obstacle from a preselected reference direction; and vehicle determining means for determining whether the obstacle tracked by said radar unit is a vehicle or another object, said vehicle determining means including two-dimensional shape data producing means for producing two-dimensional shape data of the obstacle on a two-dimensional plane in a width-wise and a vertical direction of the system vehicle based on the distance and the horizontal and vertical angles determined by said radar unit, and non-vehicle determining means for determining the obstacle as an object other than the vehicle when the two-dimensional shape data of the obstacle produced by said two-dimensional shape data determining means lies out of an ordinary vehicle shape range.

4. An obstacle recognition system as set forth in claim 3, wherein the two-dimensional shape data is a width ratio of a width of an upper portion to a width of a lower portion of the obstacle on the two-dimensional plane.

5. An obstacle recognition system as set forth in claim 4, wherein said vehicle determining means also includes obstacle movement determining means for monitoring movement of the tracked obstacle to determine whether the obstacle is a moving object or a stationary object, and wherein said non-vehicle determining means determines the obstacle as the object other than the vehicle when it is determined by said vehicle determining means that the obstacle is the stationary object and when the width ratio lies out of a given width ratio range.

6. An obstacle recognition system as set forth in claim 3, wherein the two-dimensional shape data is a ratio of a height to a width of the obstacle on the two-dimensional plane.

7. An obstacle recognition system as set forth in claim 6, wherein said vehicle determining means also includes obstacle movement determining means for monitoring movement of the tracked obstacle to determine whether the obstacle is a moving object or a stationary object, and wherein said non-vehicle determining means also determines the obstacle as the object other than the vehicle when it is determined by said vehicle determining means that the obstacle is the stationary object and when the ratio of the height to the width of the obstacle on the two-dimensional plane lies out of a given height-to-width ratio range.

8. An obstacle recognition system as set forth in claim 3, wherein said non-vehicle determining means determines the obstacle as the object other than the vehicle when a width ratio of a width of an upper portion to a width of a lower portion of the obstacle on the two-dimensional plane lies out of a given width ratio range, and wherein said non-vehicle determining means also determines the obstacle as the object other than the vehicle when a ratio of a height to a width of the obstacle on the two-dimensional plane lies out of a given height-to-width ratio range.

9. An obstacle recognition system as set forth in claim 3, wherein said non-vehicle determining means further determines the obstacle as the object other than the vehicle when a maximum width of the obstacle is lies out of a given maximum vehicle width range.

* * * * *